United States Patent

[11] 3,622,482

[72] Inventors David John Trecker
South Charleston;
Henry Octave Colomb, Jr., South
Charleston; Michael Ray Sandner,
Charleston, all of W. Va.
[21] Appl. No. 842,335
[22] Filed July 16, 1969
[45] Patented Nov. 23, 1971
[73] Assignee Union Carbide Corporation
New York, N.Y.

[54] POLYMERIC COMPOSITIONS STABILIZED &
PHOTOSENSITIZED BY SUBSTITUTED &
UNSUBSTITUTED ACYLARYLESTERS OF
ORGANIC MONOCARBOXYLIC ACIDS
10 Claims, No Drawings
[52] U.S. Cl. .................................................204/159.14,
204/159.18, 204/159.2, 204/159.23, 260/45.8,
260/45.85
[51] Int. Cl. ................................................. C08d 1/00,
C08f 1/16, C08f 45/58
[50] Field of Search........................................... 260/45.85;
204/159.18, 159.14, 159.23

[56] References Cited
OTHER REFERENCES
Bellus et al., Journal of Polymer Science B., 4, p. 1 (1966)
Hauser et al., Journal of Organic Chemistry 17, p. 390 (1952)
Son et al., Chemical Abstracts, 61 p. 13226d (1964)

*Primary Examiner*—Murray Tillman
*Assistant Examiner*—Richard B. Turer
*Attorneys*—Paul A. Rose, Louis C. Smith, Jr. and Francis M. Fazio ABSTRACT: Polymer compositions containing a minor amount of a photosensitizer-stabilizer are disclosed. The photosensitizer-stabilizer serves both to sensitize or accelerate the cross-linking on irradiation and then to stabilize the polymer against further cross-linking or degradation after the cross-linking reaction has been completed. The useful compounds are the substituted and unsubstituted acylaryl esters of organic monocarboxylic acids, such as 4-acetylphenyl benzoate, 2-acetyl-4-methylphenyl acetate, 2-acetyl-4-methylphenyl benzoate, etc. The polymer compositions can be used as protective coatings, fibers, films, for production of extruded and molded articles and those utilities in which polymers are customarily used.

POLYMERIC COMPOSITIONS STABILIZED & PHOTOSENSITIZED BY SUBSTITUTED & UNSUBSTITUTED ACYLARYLESTERS OF ORGANIC MONOCARBOXYLIC ACIDS

This invention relates to polymer compositions containing a minor amount of a unique group of compounds which serve both as photosensitizers to accelerate curing and then act to stabilize the polymer against further curing or degradation.

It is well known that the curing or cross linking of polymers can be accelerated by the addition of a photosensitizer. It is also well known that polymers can be stabilized against further curing or degradation by the addition thereto of suitable stabilizers. In the past both of these reactions required the use of two separate and distinct reactants, one to promote curing and the second to protect the polymer from further change after the desired properties had been obtained.

It has now been found that a unique group of compounds unexpectedly will act initially as photosensitizers to accelerate ultraviolet curing of a polymer and subsequently to stabilize the cured polymer against further curing or degradation on further exposure to light. The suitable compounds that are used in the polymer compositions of this invention and which are herein designated by the term "photosensitizer-stabilizer" are the substituted and unsubstituted acylaryl esters of organic monocarboxylic acids having the formula:

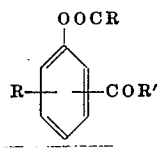

wherein R can be hydrogen or an alkyl having from one to about 10 carbon atoms, e.g. methyl, ethyl, propyl, isopropyl, butyl, t-butyl, pentyl, neopentyl, octyl, 2-ethylhexyl nonyl, decyl, etc., or aryl having from six to 14 or more carbon atoms, e.g., phenyl, napthyl, fluorenyl, anthracyl, etc., or alkaryl or aralkyl having from seven to 14 carbon atoms or more, e.g., benzyl, tolyl, xylyl, naphthal, phenethyl, etc., or cycloalkyl having from five to about seven or more ring carbon atoms, e.g., cyclopentyl, methylcyclopentyl, dimethylcyclopentyl, cyclohexyl, cycloheptyl, etc., or heterocyclic having from about five to about 10 ring atoms and the hereto atom can be oxygen, nitrogen, sulfur or phosphorus, e.g., pyrryl, thiophenyl, furfuryl, etc., and R' can be alkyl having from one to about six carbon atoms, preferably up to about three carbon atoms. In its broader aspects, the suitable acylaryl esters of monocarboxylic acids can be represented by the formula R' Co—AR—OOCR in which Ar represents a substituted or unsubstituted aryl group having up to about 14 ring carbon atoms such as the aromatic residue of the benzene nucleus, the naphthalene nucleus, the anthracene nucleus, the thionaphthalene nucleus, etc.

Among the suitable compounds one can mention 2-acetyl-4-methylphenyl acetate, 2-acetyl-4-methylphenyl hydrocinnamate, 2-acetyl-4-methylphenyl benzoate, 4-acetylphenyl benzoate, 2-acetyl-4-methylphenyl 4-methylbenzoate, (3-propionyl-4-phenyl)phenyl isobutyrate, 3-isobutyrylphenyl 4-methylbenzoate, 2-acetyl-4-butylphenyl formate, 4-acetylphenyl furan-2-carboxylate, 2-acetyl-4-(2-phenylpropyl)phenyl acetate, 2-propionyl-4-(p-tolyl)phenyl acetate, 2-acetyl-4-(B3-thiophenyl)phenyl acetate, 4-phenyl-2-acetylphenyl acetate, 4-acetylphenyl acetate, 2-acetyl-4-butylphenyl 2-ethylhexanoate, 2-acetyl-4-methylphenyl naphthoate, 2-acetyl-4-cyclopentyl-phenyl butyrate, 2-acetyl-4-methyl-1-napthyl acetate, 2-methyl-2-acetyl-4-furanyl acetate, 4-acetyl-1-napthyl acetate, 7-acetyl-4-thionapthyl acetate, 3-acetyl-4-methyl-1-anthracyl benzoate, and the like.

The polymer compositions can contain from about 0.00001, or less, to about 10 weight percent of the acylaryl esters of a monocarboxylic acid photosensitizer-stabilizer. The preferred concentration is from about 0.0001 to about 2 weight percent, with the most preferred concentration being from about 0.0001 to about 1 weight percent of the polymer composition. The higher concentrations are not desirable both from an economic point of view and because of the probability that the polymer properties may be altered, as, for example, by a plasticization effect. The extreme lower ranges are undesirable because of the probability that one does not have sufficient additive present to adequately cure and then stabilize the polymer composition. However, by proper determination of the amount of additive to be used in a particular polymer composition, one can control the reaction to obtain the maximum cure desired followed by stabilization against deleterious effects on further exposure to light radiation. Mixtures of the photosensitizer-stabilizers can be used.

The polymers that can be used are any of the known cross-linkable organic polymers and copolymers such as polyesters, polyamides, acrylic and methacrylic polymers, vinyl polymers, styrene polymers, olefin polymers, urethane polymers, siloxane polymers, polyethers, lactone polymers, etc. The cross-linkable polymers are well known to those skilled in the art and do not require a detailed description herein for an understanding of the invention. The preferred polymers are those containing a substituted or unsubstituted unsaturated bicyclo[2.2.1]hept-2-enyl group either in the polymer chain or pendant to the polymer chain. When this group is in the polymer chain it has the divalent structure

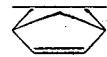

and when it is pendant to the polymer chain it has the monovalent structure

These preferred polymers are disclosed in Ser. No. 697,635, filed on Jan. 15, 1968, now abandoned by H.O. Colomb, Jr. and D. J. Trecker. The polymers and the processes for their productions disclosed therein are herein incorporated by reference but are not themselves a part of this instant invention.

The polymer compositions can be prepared by any of the conventional mixing methods, e.g., milling, kneading, mulling, solution, dispersion, emulsion, etc. Mixing procedures are well known to the polymer scientists and require no further discussion here.

The polymer compositions can be irradiated with ultraviolet light or visible light having wavelengths of from about 2,000 Angstroms, or less, to about 8,000 Angstroms, or more. The compositions can be in the form of a film, molding coating, laminate, foam, impregnate on a substrate, extrudate, or as an aqueous or nonaqueous solution, dispersion or emulsion. The compositions can be used in those known areas wherein polymers are employed, as indicated above.

Irradiation can be by exposure to the sun or sun lamps, ultraviolet lamps, mercury, cadmium, argon, krypton, xenon or carbon arcs, and the like. These devices are all well known in the art, as are the procedures and precautions to be exercised in their use. Exposure to sunlight is a preferred mode of irradiation.

The radiation dosage needed to cross-link the polymer will depend upon the intensity of the radiation, the particular polymer undergoing radiation, the concentration of acylaryl ester of monocarboxylic acid present in the composition and the particular one selected, the number of cross-linkable sites available in the polymer and the molecular weight of the polymer.

The radiation can be carried out at any temperature below the decomposition temperature, it is generally from about −75° C. to about 125° C. An inert gas atmosphere can be used, if desired, however, it is not necessary.

The acylaryl esters of the monocarboxylic acids initially function as photosensitizers to absorb the light and accelerate the curing reaction. They then slowly rearrange, in the polymer matrix, by a photoFries mechanism to an effective light stabilizer which stops the cross-linking and continues to protect the polymer against degradation due to exposure to light, whether visible or ultraviolet, which often results in embrittlement of the polymer. This photoFries rearrangement can be illustrated by the following equation:

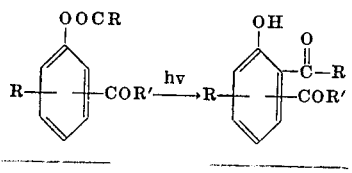

The effectiveness of the selected compounds to operate as described herein is shown by the following examples. In these examples the preferred norbornene polymers are used for illustrative purpose; however, as previously stated the polymer can be any cross-linkable organic polymer.

EXAMPLE 1

A vinyl alcohol/vinyl N-(5-norboren-2-ylnethyl)carbonate copolymer was prepared by adding 44 grams of a commercially available poly(vinyl alcohol) resin and 400 grams of dimethyl formamide to a reaction flask. The mixture was heated to 90° C., cooled to 70° C. and two drops of dibutyltin dilaurate were added. After further stirring for several minutes, 5 grams of methyl isocyanate was added through a dropping funnel and the reaction mixture was stirred at 70° C. for another hour. The polymer was filtered, washed once with hexane, twice with acetone, and then vacuum dried at 50° C. The vinyl alcohol/vinyl N-(5-norboren-2-ylmethyl)carbamate radiation convertible copolymers produced contain the following groups:

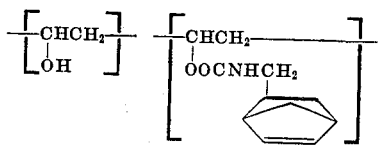

A homogeneous blend of the above copolymer was prepared containing 0.5 weight percent of 4-acetylphenyl benzoate as the photosensitizer-stabilizer. A film was produced having a thickness of 10 mils and it was irradiated 4 inches away from a 100-watt ultraviolet mercury lamp at a temperature below 50° C.

For comparative purposes films were also produced using the same copolymer without additive (Run A) and using the same polymer containing 0.5 weight per cent of the conventional photosensitizer acetophenone (Run B). These films were irradiated under the same conditions.

It was found that the films produced using the polymer composition of this invention containing the 4-acetylphenyl benzoate photosensitizer-stabilizer cross-linked to the extent of about 80 percent insolubility. At this point cross-linking stopped and the polymer was stabilized against further reaction during exposure to ultraviolet light by the stabilizing effect of the dual purpose photosensitizer-stabilizer additive. The copolymer without any additive (Run A) became completely insoluble and the copolymer with the acetophenone (Run B) reached only a 50 percent insolubility. The insolubility was determined in the examples by extraction at the boiling point with a 1:1 ethanol-water mixture. The extent of insolubility is a measure of the degree of cross-linking that has taken place. The results are tabulated below. Continued irradiation caused brittlement of the film of Run A but not of the film of example 1.

| Hours Exposure to Ultraviolet | Percent Insolubility | | |
|---|---|---|---|
| | Example 1 | Run A | Run B |
| 1 | 30 | 0 | 21 |
| 2 | 43 | 5 | 28 |
| 5 | 65 | 87 | 38 |
| 10 | 78 | 100 | 47 |
| 20 | 80 | 100 | 51 |

EXAMPLE 2

A homogeneous blend was prepared using the same copolymer of example 1 and 0.5 weight percent of 2-acetyl-4-methylphenyl acetate as the photosensitizer-stabilizer. Films were produced from the blend having a thickness of about 10 mils and then irradiated four inches away from a 100 watt ultraviolet mercury lamp at a temperature below 50° C.

For comparative purposes a film was produced with the same copolymer but without the 2-acetyl-4-methylphenyl acetate; it was irradiated under the same conditions (Run C).

The composition of this invention containing the 2-acetyl-4-methylphenyl acetate photosensizer-stabilizer started to cure within a much shorter period of time than the comparative sample and cross-linking therein stopped when the polymer was cross-linked to 90 percent insolubility. Thereafter the polymer was stabilized against further cross-linking on continued exposure to ultraviolet light. The comparative sample required about 2 hours of exposure to ultraviolet light radiation before any cross-linking was observed and it became completely insoluble and brittle upon continued irradiation. The results are tabulated below.

| Hours Exposure to Ultraviolet | Percent Insolubility | |
|---|---|---|
| | Example 2 | Run C |
| 0.5 | 30 | 0 |
| 1 | 53 | 0 |
| 2 | 67 | 5 |
| 5 | 83 | 87 |
| 10 | 87 | 100 |
| 20 | 90 | 100 |

EXAMPLE 3

An ethylene/vinyl 5-norboren-2-carboxylate copolymer was produced by charging 100 grams of an ethylene/vinyl alcohol copolymer, 500 ml. of benzene and 10 ml. of pyridine to a 1 liter flask equipped with a stirrer, a condenser (attached to a nitrogen supply and bubbler), a dropping funnel, and a thermowell with a thermocouple. Fifty milliliters of the solution were azeotropically distilled to remove any traces of water that might have been present. Then 20.5 grams of 5-chloroformyl-2-norbornene were added over a 15 minute period to the refluxing solution. The mixture was refluxed for an additional hour, cooled to 40° C. and transferred to a large beaker. Methanol was slowly added with stirring until the solution was cloudy and then 2 liters of methanol were added quickly. The ethylene/vinyl 5-norbornene-2-carboxylate copolymer was filtered, washed three times in methanol and dried. The yield Elemental 63.3 grams. Elemental analysis for carbon was 83.14 percent; theoretical value is 83.63 percent. The copolymer contained the following groups:

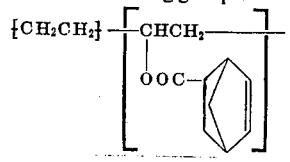

and the concentration of the above norbornenyl-containing group in the copolymer was about 15 percent by weight.

A homogeneous blend of the copolymer was prepared containing 0.5 weight of 2-acetyl-4-methylphenyl acetate as the photosensitizer-stabilizer. A film was prepared having a thickness of 10 mils and then irradiated 4 inches away from a 100-watt ultraviolet mercury lamp at a temperature below 50° c. C.

For comparative purposes films were also produced using the same copolymer without additive (Run D) and using 0.5 weight percent of the conventional photosensitizer acetophenone (Run E). These films were irradiated under the same conditions.

It was found that the films produced using the compositions of this invention cured more rapidly than the comparative samples and were then stabilized against further change. The results are tabulated below.

| Hours Exposure To Ultraviolet | Percent Insolubility Example 3 | Run D | Run E |
|---|---|---|---|
| 0.5 | 25 | 10 | 55 |
| 1 | 37 0& | 20 | 61 |
| 2 | 49 | 33 | 77 |
| 5 | 68 | 52 | 82 |
| 10 | 79 | 67 | 86 |
| 20 | 87 | 78 | (est)91 |
| 50 | 87 | 87 | (est)100 |

EXAMPLE 4

A homogeneous blend was prepared using the same copolymer of example 3 and 1 weight percent of 2-acetyl-4-methylphenyl acetate as the photosensitizer-stabilizer. Films were produced having a thickness of 10 mils and irradiated 4 inches away from a 100-watt ultraviolet mercury lamp at a temperature below 50°C.

EXAMPLE 5

A homogeneous blend was prepared using the same copolymer of example 3 and 1 weight percent of 2-acetyl-5-methylphenyl benzoate as the photosensitizer-stabilizer. films were produced having a thickness of 10 mils and irradiated 4 inches away from a 100-watt ultraviolet mercury lamp at a temperature below 50°C.

The results obtained on the compositions of examples 4 and 5 are tabulated below. In both instances the homogeneous compositions of this invention initially underwent a cross-linking reaction and then were stabilized against further cross-linking by the photosensitizer-stabilizer that was added.

| Hours Exposure To UV | Percent Insolubility Example 4 | Example 5 |
|---|---|---|
| 0.5 | 20 | 10 |
| 1 | 30 | 15 |
| 5 | 54 | 34 |
| 10 | 59 | 42 |
| 20 | 65 | 50 |
| 40 | 65 | 51 |

What is claimed is:

1. A composition comprising a major amount of a crosslinkable organic polymer containing a substituted or unsubstituted unsaturated bicyclo[2.2.1]hept-2-enyl group either in the polymer chain or pendant to the polymer chain and a minor amount of a photosensitizer-stabilizer of the formula R'COArOOCR, wherein Ar is an aryl group, having up to about 14 ring carbon atoms, R is hydrogen, alkyl of from one to about 10 carbon atoms, aryl or alkaryl or aralkyl having up to about 14 carbon atoms, cycloalkyl having from five to about seven ring carbon atoms, or heterocyclic having from five to about 10 ring carbon atoms, and R' is alkyl of from one to about six carbon atoms.

2. A composition as claimed in claim 1, wherein the photosensitizer-stabilizer is present at a concentration of from 0.0001 to 10 weight percent.

3. A composition as claimed claim 1 wherein the photosensitizer-stabilizer is present at a concentration of from 0.00001 to about 2 weight percent.

4. A composition as claimed claim 1 wherein the photosensitizer-stabilizer is a compound of the formula:

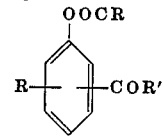

wherein R and R' are as defined in claim 1.

5. A composition as claimed in claim 1 wherein the crosslinkable organic polymer is the vinyl alcohol/vinyl N-(5- -norborene-2-ylmethyl)carbamate copolymer.

6. A composition as claimed in claim 5 wherein the photosensitizer-stabilizer is 4-acetylphenyl benzoate.

7. A composition as claimed in claim 5 wherein the photosensitizer-stabilizer is 2-acetyl-4-methylphenyl acetate.

8. A composition as claimed in claim 1 wherein the crosslinkable organic polymer is a copolymer of ethylene and vinyl 5-norboren-2-carboxylate.

9. A composition as claimed in claim 8 wherein the photosensitizer-stabilizer is 2-acetyl-4-methylphenyl acetate.

10. A composition as claimed in claim 8 wherein the photosensitizer-stabilizer is 2-acetyl-4-methylphenyl benzoate.

* * * * *

UNITED STATES PATENT OFFICE
CERTIFICATE OF CORRECTION

Patent No. 3,622,482               Dated November 23, 1971

Inventor(s) David John Trecker et al.

It is certified that error appears in the above-identified patent and that said Letters Patent are hereby corrected as shown below:

Column 1, line 52, the formula should read --R'CO-Ar-OOCR

Column 2, lines 35 to 40, the formula should read--

Column 5, line 25, the "O&" is to be deleted.

Column 6, line 28, "0.00001" should read --0.0001--.

Signed and sealed this 9th day of May 1972.

(SEAL)
Attest:

EDWARD M. FLETCHER, JR.
Attesting Officer

ROBERT GOTTSCHALK
Commissioner of Patents